Dec. 5, 1961 P. FROST 3,011,385
FRAMING ARRANGEMENT FOR IMAGES OF A CAMERA VIEW FINDER
Filed March 11, 1958 3 Sheets-Sheet 1

INVENTOR.
Paul Frost
BY
Michael S. Striker
Attorney

Dec. 5, 1961 P. FROST 3,011,385
FRAMING ARRANGEMENT FOR IMAGES OF A CAMERA VIEW FINDER
Filed March 11, 1958 3 Sheets-Sheet 2
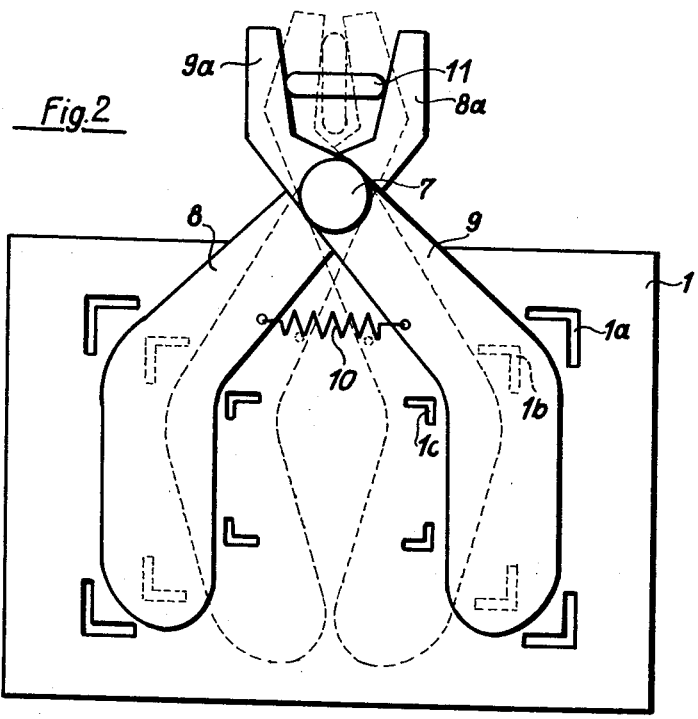
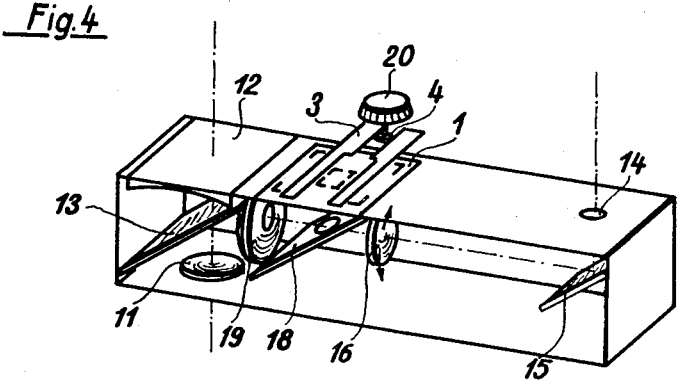
INVENTOR.
Paul FROST
BY Dec. 5, 1961 P. FROST 3,011,385
FRAMING ARRANGEMENT FOR IMAGES OF A CAMERA VIEW FINDER
Filed March 11, 1958 3 Sheets-Sheet 3

INVENTOR.
Paul FROST
BY

United States Patent Office 3,011,385
Patented Dec. 5, 1961

3,011,385
FRAMING ARRANGEMENT FOR IMAGES OF A CAMERA VIEW FINDER
Paul Frost, Munich, Germany, assignor to Agfa Aktiengesellschaft, Leverkusen-Bayerwerk, Germany
Filed Mar. 11, 1958, Ser. No. 720,686
Claims priority, application Germany Mar. 19, 1957
8 Claims. (Cl. 88—1.5)

The present invention relates to cameras.

More particularly, the present invention relates to arrangements for framing the image which appears in the view finder of a camera.

Cameras which are capable of having different objectives selectively connected therewith require different frames for the view finder image. Thus, one size frame is required for an ordinary objective, while a larger frame is required for a wide angle objective and a smaller frame is required for a telescope objective.

One of the objects of the present invention is to provide in a camera a means for selectively masking marks which produce framing images in the view finder image so that the selected marks which are proper for the particular objective have their images superposed on the view finder image.

Another object of the present invention is to provide an exceedingly simple structure for accomplishing this result.

An additional object of the present invention is to provide a structure capable of accomplishing the above objects which does not move beyond the limits of the view finder so that the structure of the invention can easily be incorporated into any view finder.

It is also an object of the present invention to provide structure capable of accomplishing the above objects and at the same time being composed of rugged, inexpensive elements which are very reliable in operation.

With the above objects in view the present invention includes in a camera a view finder means for producing a view finder image and a plurality of sets of image-framing marks located in the path of light rays which travel to the view finder means for providing images of these marks in the view finder image for the purpose of framing the view finder image. The different sets of marks are adapted to be used with different camera objectives, respectively. In accordance with the present invention at least two masking members are mounted by a suitable mounting means for simultaneous movement in opposite directions to a plurality of positions selectively interrupting the light rays which cooperate respectively with the different sets of marks to selectively prevent the images of at least one selected set of marks from appearing in the view finder image. A moving means cooperates with the masking members for simultaneously moving them in opposite directions to a selected one of the above positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 diagrammatically illustrates one structure according to the present invention for selectively masking image-framing marks;

FIG. 2 illustrates a different embodiment of a movable masking structure in accordance with the present invention;

FIG. 4 is a diagrammatic perspective view showing how the structure of the invention is oriented with range and view finder structure as well as showing the optical system for projecting the images of the image-framing marks onto the view finder image.

Figure 1:
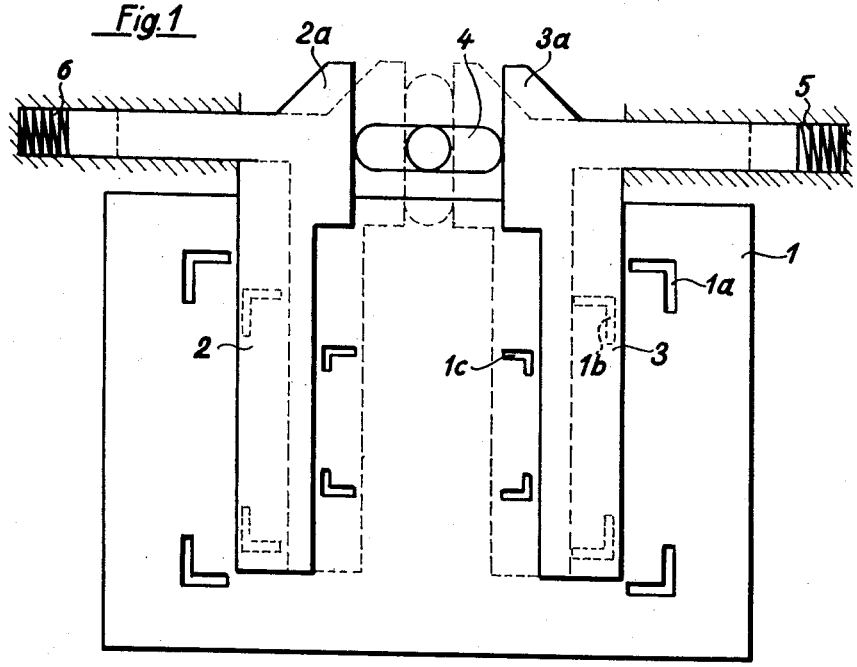

Referring to FIG. 1, three sets of image-framing marks 1a, 1b and 1c are illustrated therein. These marks are formed by substantially L-shaped slots passing through an opaque plate 1 and arranged as indicated in FIG. 1. The outermost set of marks 1a are used with a wide angle lens, the intermediate set 1b are used with a normal objective, and the innermost set of marks 1c are used with a telescope lens.

In accordance with the present invention masking members which are simultaneously movable in opposite directions are provided for selectively masking at least one of the sets of image-framing marks which is not to be used with the particular objective which is connected with the camera. Thus, in the immediate vicinity of the plate 1, either before or after the same are arranged a pair of masking members which in the embodiment of FIG. 1 take the form of a pair of elongated narrow parallel plates 2 and 3 which are mounted for movement toward and away from each other, while being maintained parallel to each other, in a plane parallel to and adjacent to the plate 1. The width of the opaque parallel masking plates 2 and 3 is great enough to enable these plates to cover one of the sets of marks, and in the solid line position shown in FIG. 1 the masking plates 2 and 3 cover the set of marks 1b. Lateral extensions of the parts 2 and 3 are guided in suitable guideways diagrammatically shown in FIG. 1, and springs 5 and 6 act on these lateral extensions to urge the plates 2 and 3 toward each other. A turnable lever 4 is located between the portions 2a and 3a of the plates 2 and 3 for controlling the position of these plates. In the solid line position of the moving means 4 shown in FIG. 1, the plates 2 and 3 are held against the force of the spring means 5, 6 in the position interrupting light rays which cooperate with the marks 1b. When the lever 4 is turned about its turning axis which is normal to the plane of FIG. 1 to the dotted line position shown in FIG. 1, the springs 5 and 6 act to place the plates 2 and 3 in the dotted line position where they interrupt the light rays which cooperate with the marks 1c, so that the latter marks are masked. Thus, with the arrangement of FIG. 1 the masking members have two positions where they mask one of the sets of image-framing marks which are not to be used. The other set of marks which is not to be used is unmasked.

Figure 5:
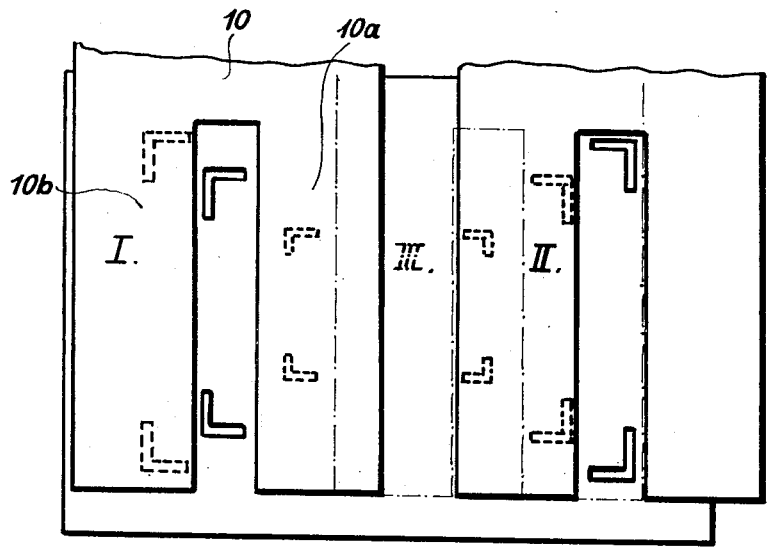
FIG. 5 is a fragmentary illustration of still another embodiment of a masking arrangement according to the present invention.

As is shown in FIG. 5, the masking plates may take the form of plates 10 having parallel legs 10a and 10b separated from each other by an elongated slot or cutout through which the light rays have access to a selected set of marks. The legs 10a and 10b are wide enough to cover the pair of sets of marks which are not to be used. The members 10 are mounted for movement in the manner shown in FIG. 1 and are urged by springs toward each other, and between their outermost side edges each member 10 has at its top edge which is not shown in FIG. 5 an extension which cooperates with a moving means similar to the lever 4 but longer than the same. In this case the lever 4 has three positions, one of which is a 45° position between the two positions indicated in FIG. 1, and the plates 10 are arranged one at a slightly higher elevation than the other so that their adjacent portions can overlap each other when they are in position III indicated in FIG. 5 where they uncover the innermost set of marks 1c. The plates have the solid line position shown at the left of FIG. 5, which is the position I, in order to uncover the intermediate set of marks 1b, and the plates have the solid line position shown at the right of FIG. 4, which is position II, when they uncover only the outermost set of marks 1a.

FIG. 2 shows another arrangement according to which the masking plates are in the form of elongated substantially V-shaped members 8 and 9 connected together in a manner similar to scissors blades and mounted by a common pivot 7 for turning movement about a common axis between the positions where the plates 8 and 9 selectively interrupt light rays passing through a selected set of marks. The member 11 of FIG. 2 corresponds to the lever 4 and is turned in the same way, and the spring 10 urges the plates 8 and 9 toward each other. The lever 11 cooperates with the extensions 8a and 9a to hold the plates 8 and 9 in the solid line position shown in FIG. 2 in order to cover the marks 1b. When the lever 11 is turned through 90° to the dotted line position, the spring 10 brings the places 8 and 9 to the dotted line position where they cover the set of marks 1c. The set of marks 1a are not blocked.

It is also possible to control the position of the plates 8 and 9 by respectively connecting them through pin and slot connections with a pair of levers which are turnable about a common axis and which are turned by a pair of pins respectively extending into slots of these levers and fixed to a turnable disc, so that with such a construction the plates 8 and 9 will also be simultaneously moved in opposite directions toward or away from each other between the positions indicated in FIG. 2.

Figure 3:
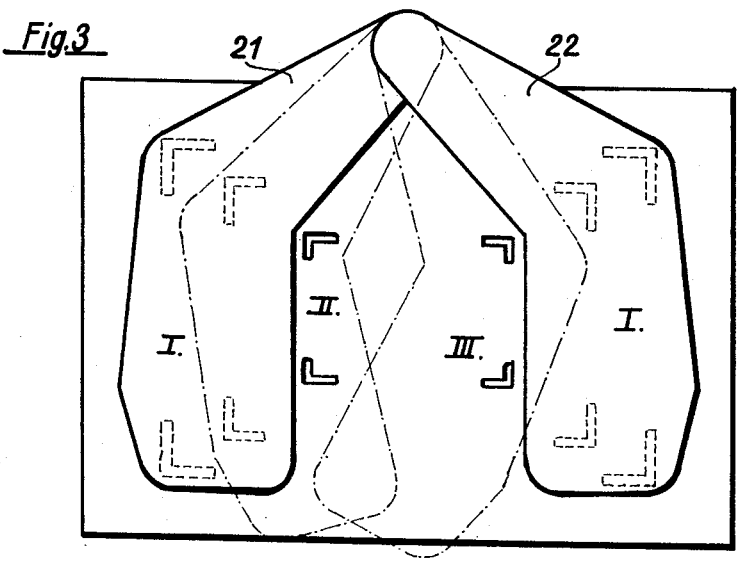
FIG. 3 shows still another embodiment of a mark masking arrangement.

FIG. 3 shows an arrangement identical with FIG. 2 except that the masking plates 21 and 22 are wider than the plates 8 and 9 and thus are capable of simultaneously interrupting light rays which cooperate with two of the sets of marks. These plates 21 and 22 are moved in the same way as the plates 8 and 9 of FIG. 2 and with the same structure, except that the lever 11 has an intermediate 45° position between its positions shown in dotted and solid lines in FIG. 2, and the plates 21 and 22 are arranged with plate 22 slightly higher than plate 21 so that the plates can overlap each other. In the position I, which is shown in solid lines in FIG. 3, only the innermost set of marks is uncovered, so that with the structure in the position shown in solid lines in FIG. 3 the masking arrangement is set for use with a telescope lens. In position II only the outermost set of marks is uncovered, while in position III only the innermost set of marks are blocked and the outermost set together with the intermediate set are simultaneously unblocked. It is only in position III with the embodiment of FIG. 3 that two sets of marks are simultaneously uncovered. If desired, instead of a moving means as shown in FIG. 2, the plates 21 and 22 of FIG. 3 may be moved by a wedge member located between the plates and shiftable in a vertical direction as viewed in FIG. 3 for moving the plates 21 and 22 against the force of a spring to a selected position. Such a wedge member can be guided for movement in a suitable groove.

FIG. 4 schematically shows the structure of the invention assembled with the range and view finder structure of the camera. As is shown in FIG. 4, the structure includes a finder ocular 11' and a view finder objective 12, and a semi-transparent reflector 13 is arranged between elements 11' and 12 so that the subject whose image is seen through the ocular 11' has its light diminished by passing through the semi-transparent reflector 13. The range finder includes a window 14 and a reflector 15 which directs the range finder rays through the adjustable range finder objective 16 to form a sharp image together with the image formed by the passage of the light through the view finder window 12 to the ocular 11'. This is a well known type of combined range and view finder.

The image-framing marks together with the adjustable masking arrangement of the present invention are arranged between the view finder window 12 and the range finder window 14, and the mirror 18 reflects light passing through the image-framing marks to the lens 19 which provides a sharp image of the image-framing marks superposed on the view finder image, the image-framing marks being reflected together with the range finder image by the same transparent reflector 13 along the optical axis of the view finder toward the ocular 11'.

The reflector 18 and the lens 19 are formed with aligned cutouts passing therethrough, and the optical axis of the range finder passes through these cutouts so that elements 18 and 19 do not interfere with the range finder. A tiltable glass prism or other means for changing the direction of light may be used. Also it makes no difference whether the lens 19 is plano-parallel at its central portion or whether the lens 19 is unifocal but has no focal length at its central portion together with the negative lens 16. FIG. 4 shows the pair of masking plates 2 and 3 located over the plate 1 which has the image-framing markings in the form of the cutouts referred to above, and FIG. 4 shows the manually turnable knob 20 connected with the lever 4 described above in connection with FIG. 1.

It will be understood that each of the elements described above, or two or more together, may also find a useful application in other types of cameras differing from the types described above.

While the invention has been illustrated and described as embodied in an image-framing arrangement for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a view finder means adapted to pass light rays therethrough for producing a view finder image; a plate located outside of the path of said light rays and being formed with a plurality of slots defining a plurality of sets of image-framing marks; reflecting means for reflecting light rays travelling through said slots into said view finder means for providing images of said marks in the view finder image for framing the latter, said sets of marks being adapted to be used with different camera objectives, respectively; at least two elongated masking members located adjacent said plate and having each an unslotted masking portion; means mounting said masking members for simultaneous movement in opposite directions to a plurality of positions selectively interrupting the light rays cooperating respectively with said sets of marks for selectively preventing images of at least one selected set of marks from appearing in the view finder image; and moving means cooperating with said masking members for simultaneously moving the same in opposite directions to a selected one of said positions.

2. In a camera, in combination, view finder means adapted to pass light rays therethrough for producing a view finder image; a plate located outside of the path of said light rays and being formed with a plurality of slots defining a plurality of sets of image-framing marks; reflecting means for reflecting light rays travelling through said slots into said view finder means for providing images of said marks in the view finder image for framing the latter, said sets of marks being adapted to be used with different camera objectives, respectively; a pair of elongated parallel masking members located adjacent said plate and having each an unslotted masking portion; means mounting said pair of masking plates for simultaneous movement in opposite directions, while remaining parallel with respect to each other, to a plurality of positions selectively interrupting the light rays cooperating respectively with said sets of marks for selectively preventing images of at least one selected set of marks from appearing in the view finder image; and moving means cooperating with said masking plates for simultaneously moving the same in opposite directions to a selected one of said positions.

3. In a camera, in combination, view finder means adapted to pass light rays therethrough for producing a view finder image; a plate located outside of the path of said light rays and being formed with a plurality of slots defining a plurality of sets of image-framing marks for providing images of said marks in the view finder image for framing the latter, said sets of marks being adapted to be used with different camera objectives, respectively; a pair of elongated substantially V-shaped unslotted masking plates located adjacent said plate; means mounting said pair of masking plates for simultaneous turning movement in opposite directions about a common axis to a plurality of positions selectively interrupting the light rays cooperating respectively with said sets of marks for selectively preventing images of at least one selected set of marks from appearing in the view finder image; and moving means cooperating with said masking plates for simultaneously moving the same in opposite directions to a selected one of said positions.

4. In a camera, in combination, view finder means adapted to pass light rays therethrough for producing a view finder image; a plate located outside of the path of said light rays and being formed with a plurality of slots defining a plurality of sets of image-framing marks; reflecting means for reflecting light rays travelling through said slots into said view finder means for providing images of said marks in the view finder image for framing the latter, said sets of marks being adapted to be used with different camera objectives, respectively; at least two elongated masking members located adjacent said plate and having each an unslotted masking portion; means mounting said masking members for simultaneous movement in opposite directions toward and away from each other to a plurality of positions selectively interrupting the light rays cooperating respectively with said sets of marks for selectively preventing images of at least one selected set of marks from appearing in the view finder image; spring means cooperating with said masking members for urging the same toward each other; and manually operable lever means located between and engaging said masking members for simultaneously moving the same apart from each other against the force of said spring means and for freeing said masking members for movement simultaneously toward each other by said spring means, so that said manually operable lever means can be operated to place said masking members in a selected one of said positions.

5. In a camera, in combination, view finder means adapted to pass light rays therethrough for producing a view finder image; a plate located outside of the path of said light rays and being formed with a plurality of slots defining a plurality of sets of image-framing marks; reflecting means for reflecting light rays travelling through said slots into said view finder means for providing images of said marks in the view finder image for framing the latter, said sets of marks being adapted to be used with different camera objectives, respectively; a pair of elongated masking members located adjacent said plate, said masking members having each an unslotted masking portion wide enough to interrupt light rays cooperating with two sets of said marks simultaneously; means mounting said masking members for simultaneous movement in opposite directions to a plurality of positions selectively interrupting light rays cooperating with two selected sets of marks for preventing images of said selected sets of marks from appearing in the view finder image; and moving means cooperating with said masking members for simultaneously moving the same in opposite directions to a selected one of said positions.

6. In a camera as recited in claim 1, said masking members each being formed with an elongated slot through which light rays have access to selected markings.

7. In a camera, in combination, view finder means adapted to pass light rays therethrough for producing a view finder image; a plate located outside of the path of said light rays and being formed with a plurality of slots defining a plurality of sets of image-framing marks; reflecting means for reflecting light rays travelling to said view finder means for providing images of said marks in the view finder image for framing the latter, said sets of marks being adapted to be used with different camera objections, respectively; at least two elongated masking members having each an unslotted masking portion; means mounting said masking members for simultaneous movement in opposite directions to a plurality of positions interrupting the light rays cooperating with all except a selected one of said sets of marks so that only images of the selected set of marks appear in the view finder image; and moving means cooperating with said masking members for simultaneously moving the same in opposite directions to a selected one of said positions.

8. In a camera, in combination, view finder means adapted to pass light rays therethrough; a plate located out of the path of said light rays and being formed with a plurality of slots defining a plurality of sets of image-framing marks; reflecting means for reflecting the light rays travelling through said slots into said view finder means for providing images of said marks in the view finder image for framing the latter, said sets of marks being adapted to be used with different camera objectives, respectively; a pair of masking members having each an unslotted masking portion adjacent said plate and a camming portion outside said plate; means mounting said masking members for simultaneous movement in opposite directions to a plurality of positions in which said masking portions thereof selectively interrupt the light rays cooperating respectively with said sets of marks for selectively preventing images of at least one selected set of marks from appearing in the view finder image; and cam means turnable about a fixed axis and cooperating with said camming portions of said masking members for simultaneously moving the masking portions of said masking members in opposite directions to a selected one of said positions.

References Cited in the file of this patent

UNITED STATES PATENTS

| | | |
|---|---|---|
| 2,149,384 | Becker | Mar. 17, 1939 |
| 2,187,246 | Nerwin | Jan. 16, 1940 |
| 2,364,413 | Wittel | Dec. 5, 1944 |
| 2,805,608 | Leitz et al. | Sept. 10, 1957 |

FOREIGN PATENTS

| | | |
|---|---|---|
| 523,662 | Great Britain | July 19, 1940 |
| 553,392 | Italy | Dec. 22, 1956 |